(12) United States Patent
Kidder

(10) Patent No.: US 6,789,299 B1
(45) Date of Patent: Sep. 14, 2004

(54) QUICK CHANGE TOOLING SYSTEM FOR MACHINE TOOLS

(76) Inventor: Ronnie J. Kidder, 308 Zachary Dr., Scott, LA (US) 70583

( * ) Notice: Subject to any disclaimer, the term of this patent is extended or adjusted under 35 U.S.C. 154(b) by 75 days.

(21) Appl. No.: 10/300,322

(22) Filed: Nov. 19, 2002

Related U.S. Application Data

(60) Provisional application No. 60/331,878, filed on Nov. 20, 2001.

(51) Int. Cl.⁷ .............................................. B23B 29/34
(52) U.S. Cl. ................................ 29/39; 82/159; 82/160
(58) Field of Search .......................... 82/159, 121, 120, 82/158, 160, 161; 29/39, 40

(56) References Cited

U.S. PATENT DOCUMENTS

| | | | |
|---|---|---|---|
| 2,389,858 A | * 11/1945 | Anthony et al. ............... | 82/158 |
| 2,621,396 A | * 12/1952 | Candido ....................... | 82/159 |
| 2,833,546 A | * 5/1958 | Johnson ....................... | 82/159 |
| 3,815,928 A | * 6/1974 | Komori ....................... | 82/158 |
| 3,981,211 A | * 9/1976 | Turner ......................... | 82/158 |
| 4,770,075 A | * 9/1988 | Potemkin ..................... | 82/159 |
| 4,945,793 A | * 8/1990 | von Haas ..................... | 82/161 |
| 5,065,492 A | * 11/1991 | Von Haas et al. .............. | 29/39 |
| 5,341,551 A |   8/1994 | Brown et al. | |
| 5,452,631 A |   9/1995 | Erickson | |
| 5,875,696 A | * 3/1999 | Grossmann ................... | 82/159 |

FOREIGN PATENT DOCUMENTS

JP        11-058108 A   *  3/1999

OTHER PUBLICATIONS

Haas Automation, Inc. Catalog entitled CNA Turning Centers.
Hitachi Seiki Profile.
Sandvik Coromant Catalog entitled Coromant Capto Modular Tool System. Published 5/1.

* cited by examiner

*Primary Examiner*—Erica Cadugan
(74) *Attorney, Agent, or Firm*—Garvey, Smith, Nehrbass & Doody, LLC; Gregory C. Smith

(57) ABSTRACT

A versatile quick change tooling system for internally and externally mounted machine tools which provides components adaptable to a system which is easy to maintain since it has no moving parts. The system would allow for universal adaptation of both internal and external tools on a machine turret and would include a turret having a face portion for mounting tools thereon; a plurality of receivers adjustable to centerline engaged either to the face portion or the perimeter portion of the turret; a tapered bore formed into each of the receivers; a tool holder, with a tool secured to a first end, and having a second end being a tapered shank to be positioned within the tapered bore of each of the receivers; a retainer secured to the tapered shank to secure each tool holder to each receiver; and allowing each of the tool holders mounted to the receivers to be easily removed by unsecuring the retainer from the tapered shank, and replacing the tool holder with a new tool holder and tool secured thereupon. A stop clamp would be included to orient the tool radially and is attached to the tool holder. A stop block is attached to the receiver and engages the stop clamp for proper alignment of the tool.

16 Claims, 6 Drawing Sheets

QUICK CHANGE TOOLING SYSTEM FOR MACHINE TOOLS

CROSS-REFERENCE TO RELATED APPLICATIONS

This application claims priority of provisional patent application entitled "Quick Change Tooling System for Machine Tools," Ser. No. 60/331,878, filed on Nov. 20, 2001 by the same inventor.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to machine tools. More particularly, the present invention relates to a versatile quick change tooling system for universal adaptation of both internal and external machine tools which requires a minimal amount of time and provides benefits not found in other systems.

2. General Background

Machine tool systems in the past have been designed to accommodate a number of tooling, but overall have required that any change out of tools is time-consuming. Although other companies may teach the use of a quick change system of tooling, such a modification is done on a very limited basis and usually is focused on the company's particular tools.

In the art, Haas Automation, Inc., provides a tool turret which allows a combination of ID and OD tools, providing a rear retention nut. However, the Haas system is limited to cylindrical mating of holder to turret. This does not allow for surface to surface contact as the versatile quick change (VQC) of the present invention, which uses a proven British Taper (bt) or Caterpillar (cat) design. Haas also has the ability to accommodate a universe of tools. Further, the Haas system does not have an adaptor (receiver) to adjust the centerline of the station on the turret. All assemblies will be slightly off center and cause the tool holder to be off center. This adaptor/receiver will allow the immediate and consistent mounting of tooling which yields increased production through a reduction of tool wear and increased part dimensional quality.

The same can be said for Hitachi Seiki whose turrets are limited to tool assemblies manufactured by Hitachi Seiki. Also, the Hitachi-Seiki does not have either the radial or center line adjustment.

Other manufacturers, such as Sandvik Coromant, Kennametal, and HSK Systems, as applicant appreciates, do allow adapting a universe of tools but do not allow for easy adjustment of the tools after the tools are mounted. The VQC system is much easier to clean than the Sandwik or Kerinamtal systems. Clean systems greatly improve the performance and life of all the components of the VQC system. Additionally, both Sandvik and Kennametal have many more parts to make up their assembly. These systems cost more and have many moving parts, and are limited to internal or external in their present offering. Sandvik does not provide a means to easily adjust the orientation of the cutting tool on an individual basis as it is presented to the work piece on either the od or id systems. The id system is limited by the cylindrical mating of the receiver to the block mounted on the turret. The catalogs of these manufacturers which are available to applicant will be identified in the Information Disclosure Statement to be provided.

Therefore, there is a need in the industry to provide a method and system for changing various types of machine tool systems quickly which can be retrofitted onto existing machines, and which have the capability of accommodating a universe of tools of various manufacturers. Also, there is a need to have a system such as the VQC system of the present invention which is easy to clean and maintain; has radial orientation via a stop clamp; has alignment to centerline of each station via the receiver; and can utilize the majority of a customer's current tooling which lowers the cost of the system.

BRIEF SUMMARY OF THE INVENTION

The apparatus of the present invention teaches the use of a versatile quick change tooling system for internally and externally mounted machine tools which provides components adaptable to a system which is easy to maintain since it has no moving parts. The system would allow for universal adaptation of both internal and external tools on a machine turret and would include a turret having a face portion for mounting tools thereon; a plurality of receivers adjustable to centerline engaged either to the face portion or the perimeter portion of the turret; a tapered bore formed into each of the receivers; a tool holder, with a tool secured to a first end, and having a second end being a tapered shank to be positioned within the tapered bore of each of the receivers; a retainer secured to the tapered shank to secure each tool holder to each receiver; and allowing each of the tool holders mounted to the receivers to be easily removed by unsecuring the retainer from the tapered shank, and replacing the tool holder with a new tool holder and tool secured thereupon. A stop clamp would be included to orient the tool radially and is attached to the tool holder. A stop block is attached to the receiver and engages the stop clamp for proper alignment of the tool.

Therefore, it is a principal object of the present invention to provide a system for allowing both internal and external tools to be mounted and interchanged on a turret in a minimal of time.

It is a further; object of the present invention to provide a versatile quick change tool system which is cost effective, and includes the following attributes:

1. Low maintenance:
    a. No moving parts.
    b. Requires cleaning at switching of tools. Cleaning is quick and easy to do with the aid of a simple, inexpensive tool.
2. High Repeatability: Less than 0.001 is expected.
3. Has radial orientation to adjust the height of insert above or below the centerline.
4. Mounted cutting tools are mounted as desired and then fixed. They can then be removed and reinstalled as a unit quickly with repeatability.
5. Through the tool coolant where available.
6. Have any combination of internal or external stations at any time.
7. Interference considerations are reduced for speedy setup of job, due to allowing any tool in any station, the time required to set a job up can be reduced when the changing of tooling location on the turret (station) is required due to interference between other tooling or workholding.

8. This system can be adapted to new and existing turrets.

9. Replacement of broken tooling is less costly as compared to dedicated systems.

10. Coolant can be applied through the tool or externally set individually at each tool using rigid tubing, and utilizing a flow valve.

11. Each receiver is independently adjustable on the turret.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
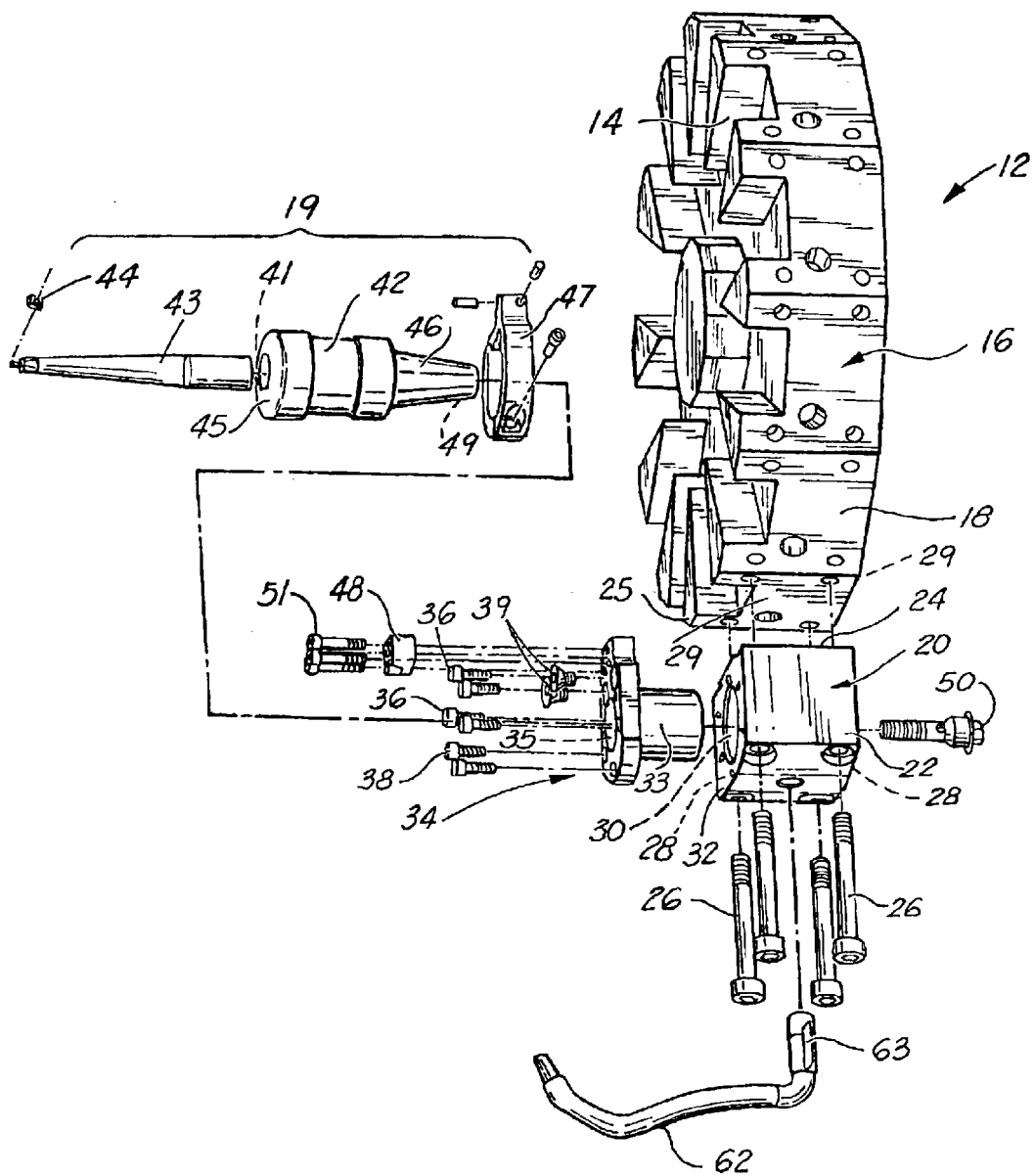
FIG. 1 illustrates an exploded view of the overall system for mounting tools on the periphery of the turret.
Figure 2:
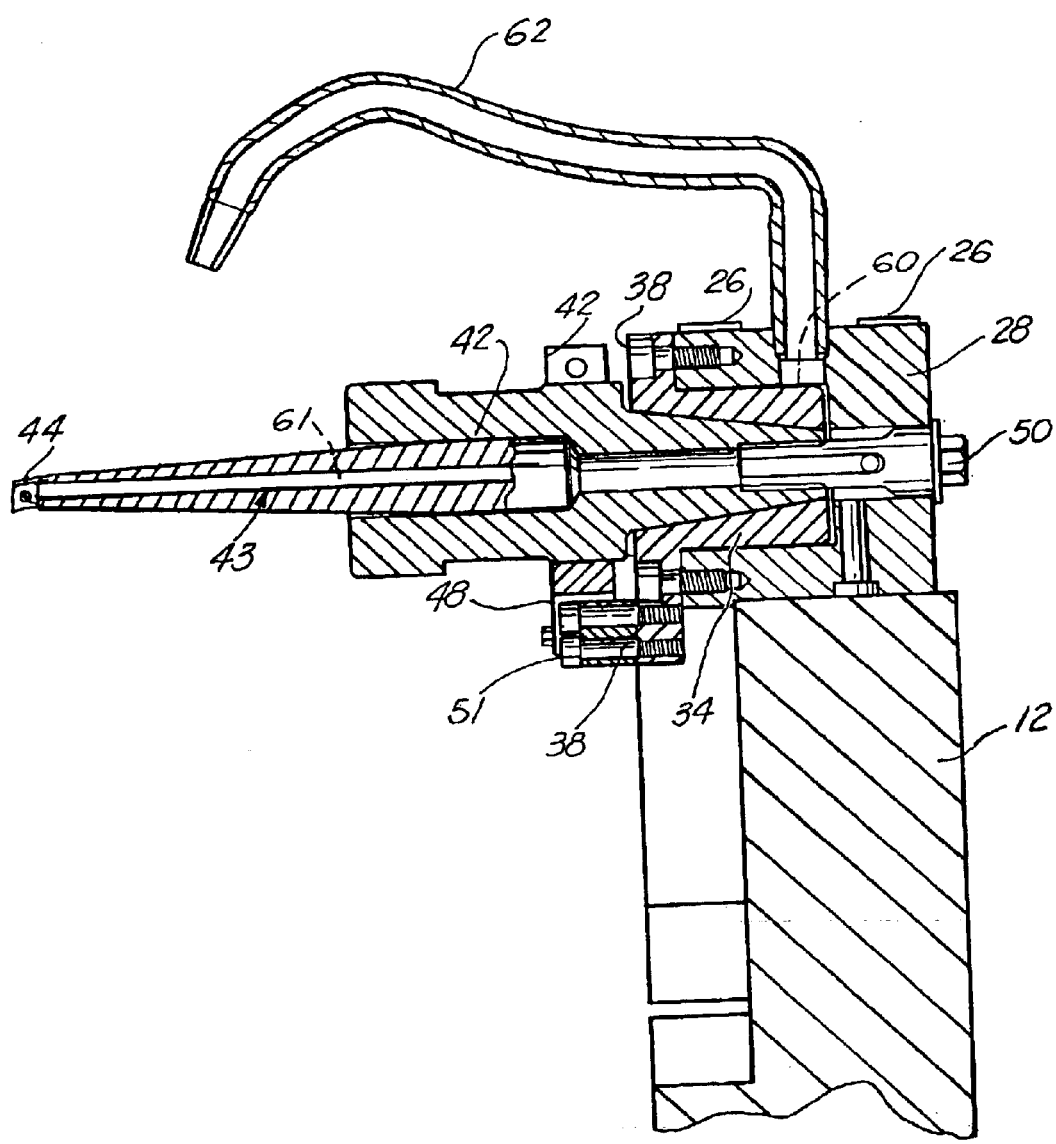
FIG. 2 illustrates a cross-section view of a machine tool mounted on the periphery of the turret.
Figure 3:
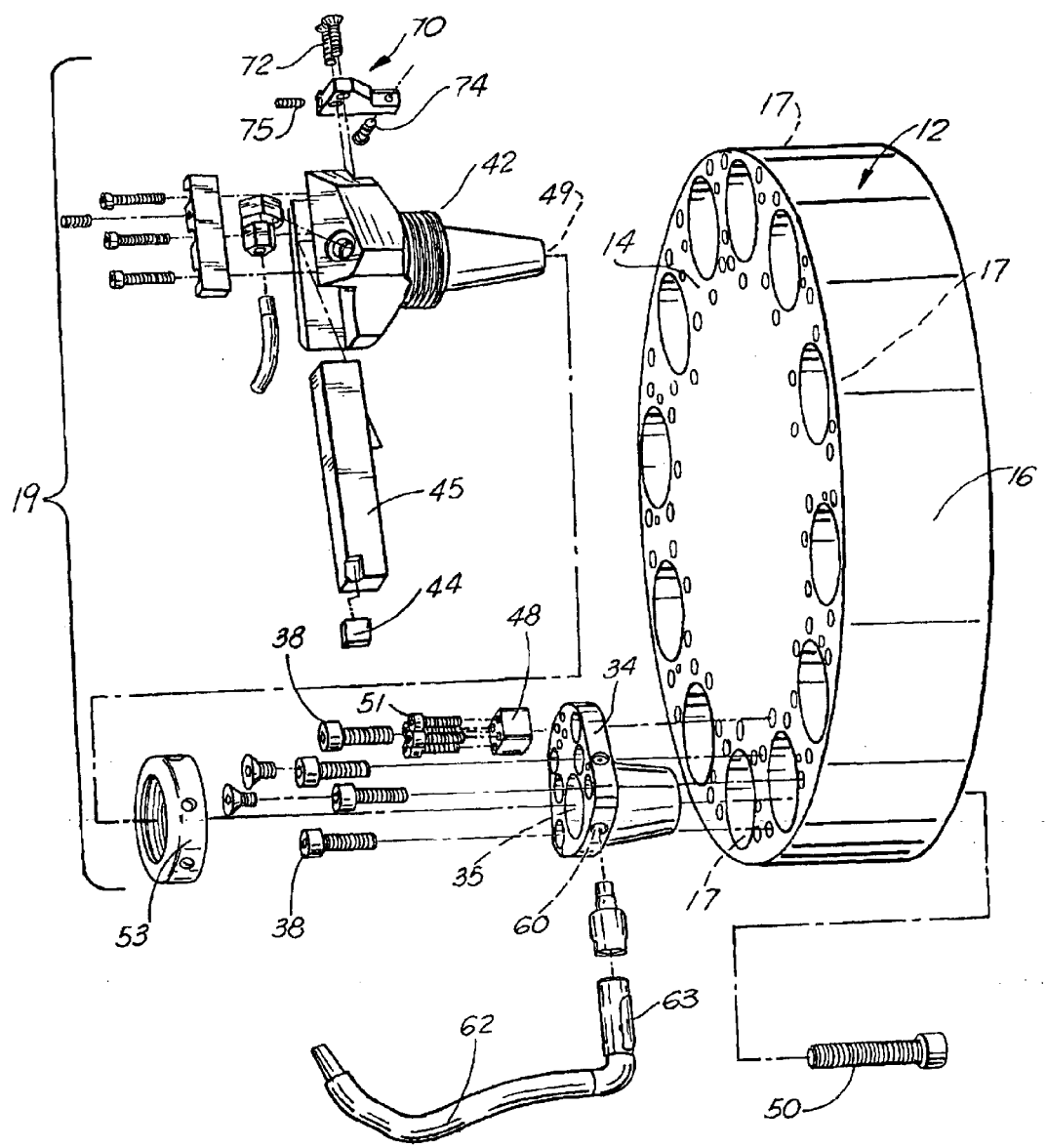
FIG. 3 illustrates an exploded view of the overall systems for mounting tools on the face of the turret.
Figure 4:
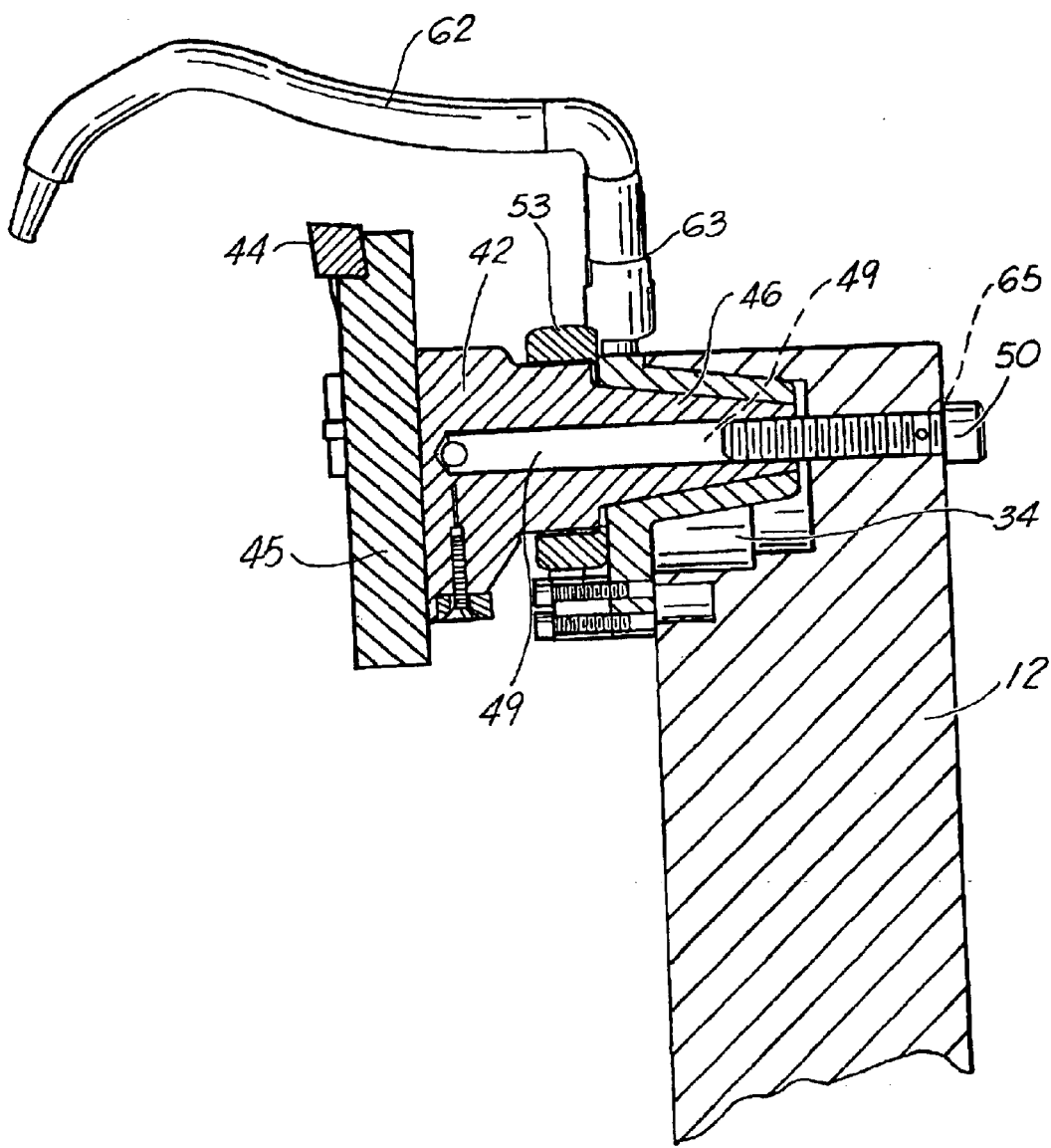
FIG. 4 illustrates a cross section view of a machine tool mounted on the face of the turret.
Figure 5:
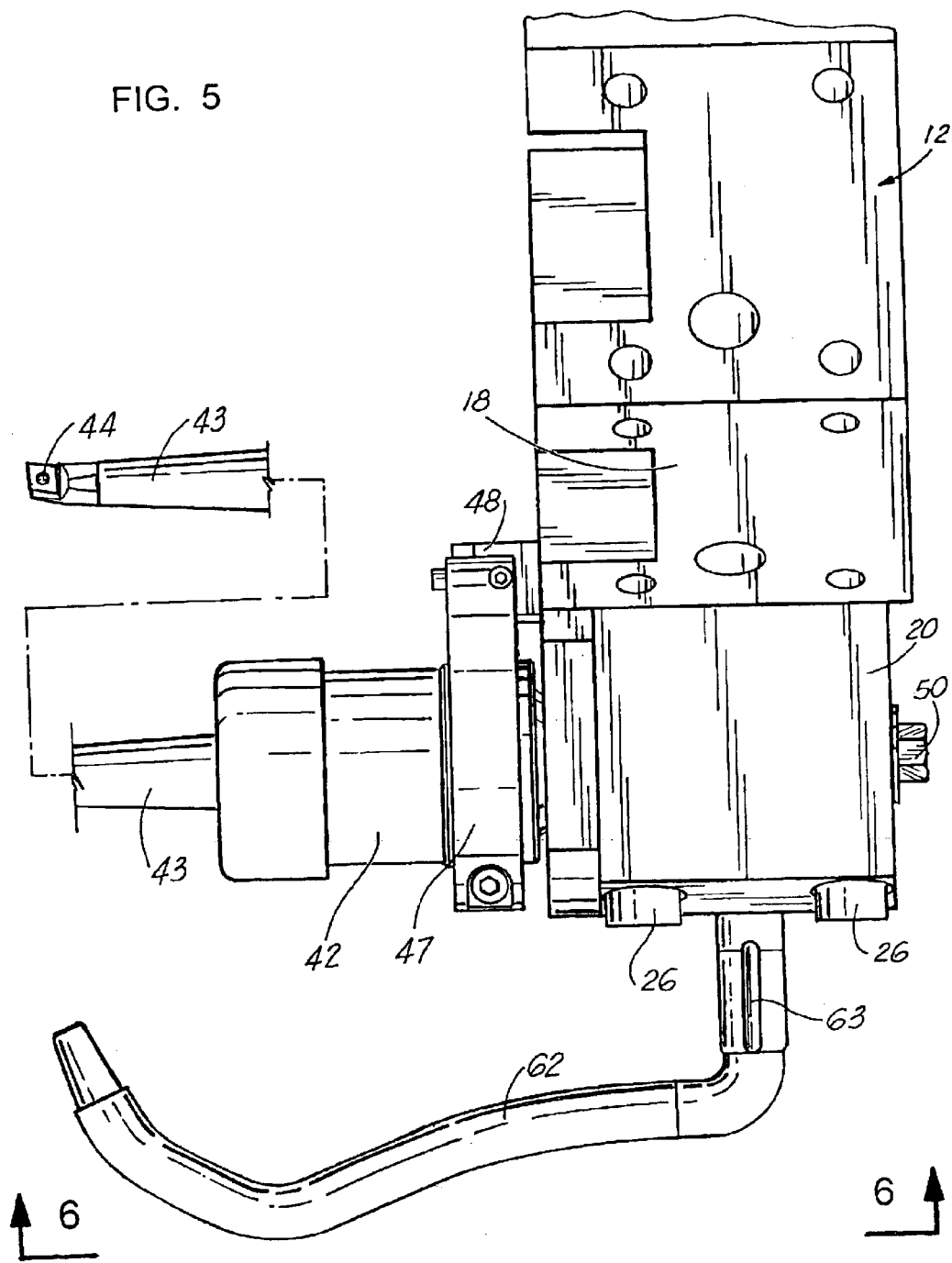
FIGS. 5 and 6 illustrate top and end views respectively of the machine tool mounted on the periphery of the turret.
Figure 6:
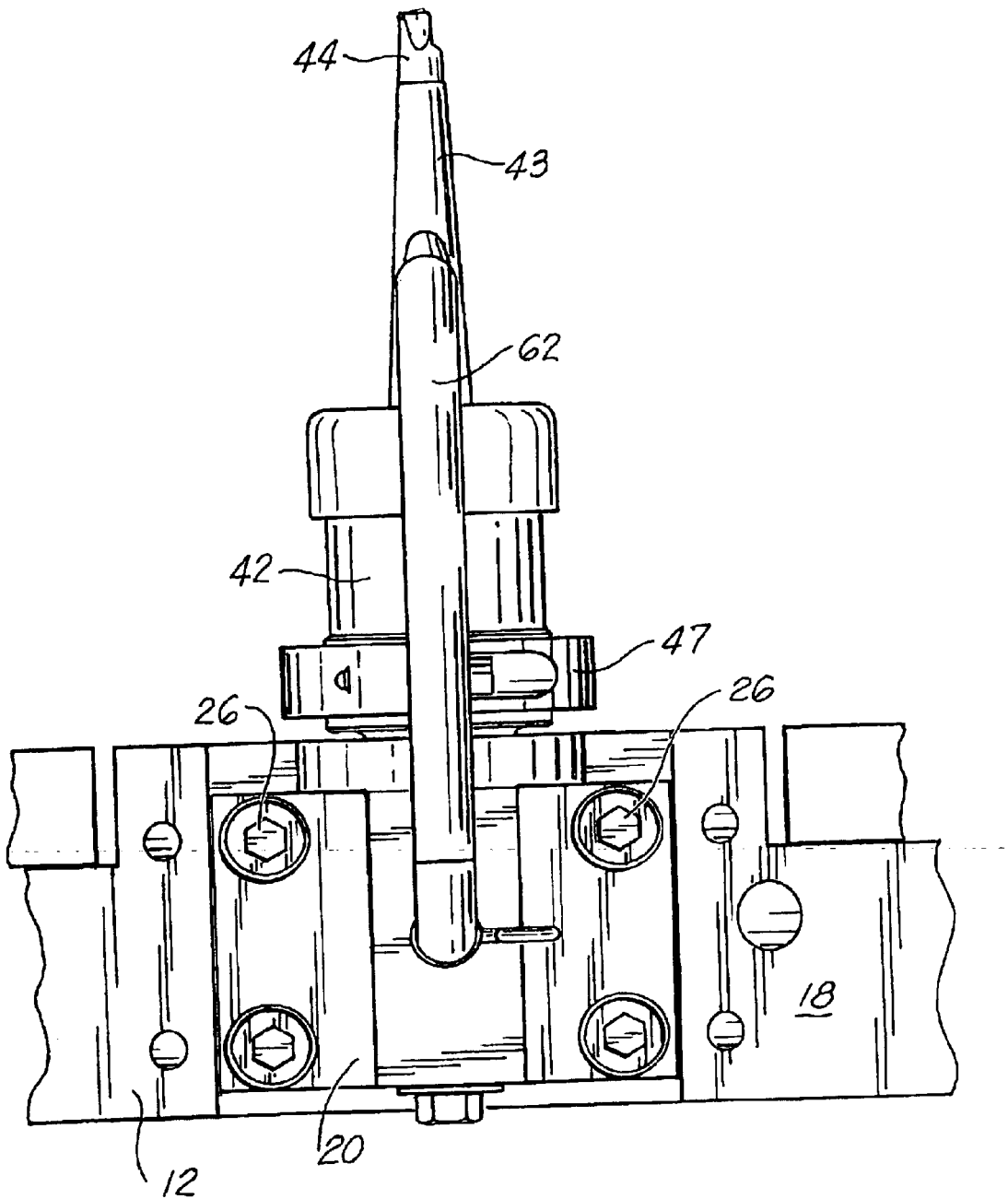

FIGS. 1 through 6 taken together illustrate the preferred components which comprise the apparatus and system of the present invention. Reference will be made first to FIGS. 1, and 5 and 6 which illustrate a machine tool mounted to the periphery of a turret in the preferred embodiment of the present invention, while FIGS. 3 and 4 illustrate machine tools mounted to the face of a turret in a second preferred embodiment of the present invention.

As illustrated in FIG. 1, there is provided a standard turret 12, comprising a circular component, having a face portion 14, and a peripheral edge 16. Turret 12 would comprise a plurality of stations 18 along its peripheral edge 16 wherein each station would accommodate a tool assembly 19, to be defined further, for mounting thereupon, as will be described further. In the system of the present invention as seen in FIGS. 1, 5 and 6, each station 18 would have the ability to mount any tool assembly desired, manufactured by any tool manufacturer, which provides it universality in mounting various tool assemblies there upon.

Turning now to the assembly being mounted on a particular station 18, reference is made to FIG. 1, where there is illustrated in exploded view a mounting block 20 having a body portion 22, with an inner face 24 which would mount upon surface 25 of station 18. The block 20 would be secured to station 18 with a plurality of mounting bolts 26, preferably four in number, which would be received into bores 28 of block 20 and threadably engaged into ports 29 on the surface 25 of station 18. The block 20 would include a bore 30 in its face 32 for receiving the circular portion 33 of a receiver 34. Receiver 34 would include a face portion 36 which would accommodate a plurality of bolts 38 to be engaged therethrough and threadably engaged to the face 32 of block preferably six bolts 38 in total. Receiver 34 would also include a tapered bore 35 formed within the circular portion 33, and a stop block 48. Once the receiver 34 is secured in place on block 20, the tool assembly 19, which would include a tool holder 42, a boring bar 43 for securing tool 44 in place, a circular holder clamp 47, would be set in place. The tool holder 42 would have a first nut portion 45 for securing the bar 43 thereupon, and a second tapered shank portion 46 for engaging into the tapered bore 35 of receiver 34. By providing the mating surfaces between shank portion 46 and bore 35, as tapered, there is assured that the surface contact will be circumferential and not along a single line of surface contact point. The holder clamp 47 would be secured around holder 42, and would engage stop block 48 to assure proper radial orientation alignment of tool 44 for use. Stop block 48 would be secured to receiver 34 by bolts 51, preferably four in number. The tapered portion 46 of holder 42 would be engaged into the tapered opening 35 of receiver 34 and would be held in position by a single bolt 50 which would thread into a bore 49 of the tapered shank portion 46 of holder 42 as seen in FIGS. 1 and 2. It is with this single connection between the receiver 34 and the holder 42 that allows the tool assembly 19 to be engaged and disengaged from the receiver quickly and with proper alignment. This manner of mounting the assembly 19 onto the receiver 34 would allow a universe of tool assemblies to be placed thereupon, including tools manufactured by various manufacturers. It is provided that when a particular tool assembly 19 would be interchanged for another tool assembly 19, the bolt 50 would be loosened, and the pair of screws 39, as seen in FIG. 1, would be backed out of receiver 34, so as to disengage tool assembly 19 from the receiver 34. Then, bolt 50 would be fully removed and the assembly 19, including the tool 44, the tool holder 42 and the clamp 47 would be removed as a single unit from the receiver 34. The replacement assembly 19 would be set in place by rotating the stop clamp 47 on assembly 19 to the stop block 48 on receiver 34, and the bolt 50 retightened to complete the change out of the tool assembly 19. Of course, screws 39 would have to be fully re-engaged into receiver 34 before the new assembly 19 could be fully engaged by bolt 50.

As illustrated in the FIGS. 1 and 2, the assembly 19 would be provided with a means for delivering a lubricant to the tool in operation, via an oil line 60, which may extend internally of the assembly 19, through a bore 61 in bar 43, or provide an outer line 62 which would deliver oil externally to the workpiece during cutting by the tool in question. There would be provided a valve 63 on the line 62 for allowing flow through line 62 should the method of lubrication be external, rather than internal of the assembly 19.

Turning now to FIGS. 3 and 4, reference is made to the turret 12 of the type for accommodating tools 44 on the face 14 of the turret 12, rather than along its peripheral wall portion 16. The turret face 14 would include a plurality of openings 17 for allowing a receiver 34, of the type as described in relation to FIGS. 1 and 2, to be positioned within an opening 17, and secured in place with the plurality of bolts 38; preferably 4 in number. The tool assembly 19, again as described earlier, comprising the tool holder 42, the tool 44 itself secured to the end of a bar 43 secured to holder 42, and the threaded nut 53, would be engaged onto the receiver 34. The tapered shank portion 46 of the holder 42 would be slid into the tapered bore 35 of the receiver 34, and like the first externally tool mounted embodiment, would be secured in place with the single bolt 50 threaded into a bore 49 within the shank portion 46 of holder 42, as seen in FIGS. 3 and 4. Furthermore, to assure proper radial alignment of the tool assembly 19, there is provided a stop 70, as seen in FIG. 3, which is secured to holder 42 via screws 72. Stop 70 would include an adjustment screw 74, which would engage against stop block 48, and when properly set, would be held in position on stop 70 via screw 75, thus assuring proper alignment of tool assembly 19 onto receiver 34.

The threaded nut 53 would thread onto the threaded portion of holder 42, and would provide the same function as screws 39 provided for the assembly 19 mounted on the periphery of the turret 12. That is, after the bolt 50 is loosened, the nut 53 would be loosened manually, and the assembly would be forced away from the receiver 34 and the bolt 50 would be removed so that the assembly 19 could be removed and replaced with a new assembly 19.

Again, as with the first embodiment, when the tool 44 is to be replaced, the bolt 50 is slightly disengaged from the bore 49 in the tapered shank 46 of the holder 42, the nut 53 is loosened, to back the assembly 19 from the receiver 34, and upon removing bolt 50, the entire assembly 19, is removed from the receiver 34 on turret 12 and then replaced. Like the first embodiment, there would be provided either an inner line for delivering oil or the like lubricant to the workpiece and tool 44, through bore 49 which connects to port 65 in bolt 50, or the lubricant would be routed to the exterior line 62 for exterior delivery to the workpiece. Also, as with the embodiment shown in FIGS. 1 and 2, there would be provided a valve 63 on the line 62 for allowing flow through line 62 should the method of lubrication be external, rather than internal of the assembly.

In both embodiments as illustrated in FIGS. 1 through 6, it is the ability of the system to accommodate a universe of tools or tool assemblies mounted internally or externally on the turret which provides its universal function. The invention would allow the retrofitting of current turrets of various systems so as to allow the turrets to utilize this system and utilize tools of various manufacturers, rather than be restricted to certain tools of certain manufacturers.

Parts List:
turret 12
face portion 14
peripheral edge 16
stations 18
tool assembly 19
mounting block 20
body portion 22
inner face 24
surface 25
mounting bolts 26
bores 28
ports 29
bore 30
face 32
circular portion 33
receiver 34
tapered bore 35
screws 39
tool assembly 40
bore 41
holder 42
bar 43
tool 44
bar 45
tapered shank portion 46
holder clamp 47
stop block 48
bore 49
bolt 50
bolts 51
threaded nut 53
oil line 60
bore 61
outer line 62
valve 63
port 65
stop 70
screws 72
screw 74
screws 75

The foregoing embodiments are presented by way of example only; the scope of the present invention is to be limited only by the following claims.

What is claimed is:

1. A system for allowing universal mounting of tool assemblies on a machine turret, comprising:
   a. a turret having a face portion for mounting tool assemblies thereon;
   b. at least one receiver engaged to the face portion of the turret;
   c. a tapered bore formed into the at least one receiver;
   d. at least one tool assembly having a tool in a first end and a tapered shank on a second end to be positioned within the tapered bore of each receiver;
   e. a securing device for securing each tool assembly and receiver to the turret, each securing device consisting of a single retainer for securing the shank of the respective tool assembly within the tapered bore to undertake a tooling operation and for easily removing the respective tool assembly by disengaging the retainer from the shank, to be replaced by a different tool assembly; and
   f. means on the at least one tool assembly for engaging a stop block on the at least one receiver for properly aligning the respective tool assembly which is secured to the respective receiver.

2. The system in claim 1, wherein the turret may accommodate a plurality of the tool assemblies independently engaged on each receiver on the turret.

3. The system in claim 1, wherein the means for properly aligning each tool assembly on its respective receiver comprises a stop mounted on each tool assembly to engage the stop block mounted on each of the receivers.

4. The system in claim 1, wherein each of the retainers comprises a single bolt engaging the shank of a respective one of the tool assemblies within the tapered bore of the respective receiver.

5. The system in claim 1, wherein the system is capable of receiving a universe of tools properly aligned into the receiver.

6. The system in claim 1, further comprising a plurality of the receivers mounted to the turret face at spaced apart intervals.

7. A system for allowing universal adaptation of tools on a machine turret, comprising:
   a. a turret having a peripheral edge for mounting tools thereon;
   b. at least one mounting block secured onto a portion of the peripheral edge of the turret;

c. at least one receiver engaged to each block secured to the turret;

d. a tapered bore formed into the at least one receiver;

e. at least one tool assembly, including a tool holder, having a first end for mounting a tool thereupon and a second end comprising a tapered shank to be positioned within the tapered bore of each receiver;

f. a securing device for securing each tool assembly and receiver to a respective mounting block, each securing device consisting of a single retainer; and g. a stop block mounted on the at least one receiver which is engaged by a holder clamp on the respective tool assembly to assure properly alignment of the respective tool assembly onto the at least one receiver to undertake a tooling operation.

8. The system in claim 7, wherein each of the retainers comprises a bolt engaged through a respective one of the mounting blocks into the tapered shank of the respective tool holder for securing the respective tool assembly onto the respective mounting block with a single element.

9. The system in claim 7, wherein the tools are mounted onto the turret as a universal mounting system capable of accommodating a universe of tools and tool assemblies.

10. The new system in claim 7, further comprising a plurality of the receivers mounted to the peripheral edge of the turret at spaced apart intervals.

11. The system in claims 1 or 7, or wherein the system further comprises a means for backing each tool assembly off of each of the receivers when a particular one of the assemblies is to be removed and replaced.

12. The system in claims 1 or 7, further comprising a system of liquid coolant for preventing the tools from heating beyond acceptable limits during the machining process.

13. A tool system for allowing the mounting of a universe of tools on a single turret, comprising:

a turret having a face portion for mounting a plurality of receivers thereon;

each receiver having a tapered bore formed in its face;

each of the bores capable of accepting a tapered shank of a tool assembly;

each tool assembly capable of receiving a universe of tools thereupon;

each tool assembly and receiver being secured to the turret with a securing device consisting of a single retaining bolt member for securing each of the shanks of the tool assemblies within each of the tapered bores of the receivers and for easily removing each tool holder by disengaging each retaining bolt from each tapered shank, to be replaced by a different tool assembly;

and a stop mounted on each tool assembly for engaging a stop block on each receiver for aligning each of the tool assemblies to each of the receivers to undertake a tooling operation.

14. The tool system in claim 13, wherein each tool assembly comprises one of the tool holders, one of the tools mounted on a respective tool holder, a nut to release the tool assembly from the respective receiver and a stop for positioning the tool assembly properly on the respective receiver.

15. A tool system for allowing the mounting of a universe of tools on a single turret, comprising:

a turret having a peripheral edge defining a plurality of mounting stations thereupon;

a mounting block on each mounting station for engaging a receiver thereon;

each receiver having a tapered bore formed in its face;

each of the bores capable of accepting a tapered shank of a tool holder;

each tool holder capable of receiving a universe of tools thereupon;

each tool assembly and receiver being secured to a respective mounting block with a securing device consisting of a single bolt member for securing each of the shanks of the tool holders within each of the tapered bores of the receivers to undertake a tooling operation and for easily removing each tool holder by disengaging each retaining bolt from each tapered shank, to be replaced by a different tool mounted to a different tool holder;

and means on each tool assembly for engaging a stop block on each receiver for properly aligning each tool assembly which is secured to each of the receivers.

16. The system in claims 1 or 7 or 13 or 15 wherein each receiver can be aligned independently on the turret at each station.

* * * * *